United States Patent
Marche (10) Patent No.: US 7,063,290 B2
(45) Date of Patent: Jun. 20, 2006

(54) MOUNTING SYSTEM INSERTED BETWEEN AN AIRCRAFT ENGINE AND A RIGID STRUCTURE OF AN ATTACHMENT STRUT FIXED UNDER A WING OF THIS AIRCRAFT

(75) Inventor: Hervé Marche, Roquettes (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/059,442

(22) Filed: Feb. 17, 2005

(65) Prior Publication Data

US 2005/0269444 A1 Dec. 8, 2005

(30) Foreign Application Priority Data

Mar. 4, 2004 (FR) .................................. 04 50443

(51) Int. Cl.
*B64D 27/00* (2006.01)
(52) U.S. Cl. ............................ 244/54; 60/796; 60/797; 248/554; 248/556; 248/557; 248/555
(58) Field of Classification Search ............. 244/53 R, 244/54, 55, 58, 60, 131; 60/796, 797; 248/554, 248/555, 556, 557, 674, 637
See application file for complete search history.

(56) References Cited

U.S. PATENT DOCUMENTS

| | | | | |
|---|---|---|---|---|
| 3,278,138 | A | * | 10/1966 | Haberkorn .................. 244/12.3 |
| 4,022,018 | A | * | 5/1977 | Tuten et al. ................. 60/200.1 |
| 4,326,682 | A | * | 4/1982 | Nightingale .................. 244/54 |
| 4,457,863 | A | * | 7/1984 | Kawai et al. ................. 530/372 |
| 4,458,863 | A | | 7/1984 | Smith |
| 4,555,078 | A | * | 11/1985 | Grognard ...................... 244/54 |
| 4,676,458 | A | * | 6/1987 | Cohen .......................... 244/58 |
| 4,997,145 | A | * | 3/1991 | Hodgkinson .................. 244/54 |
| 5,065,959 | A | * | 11/1991 | Bhatia et al. .................. 244/54 |
| 5,197,692 | A | * | 3/1993 | Jones et al. ................... 244/54 |
| 5,319,922 | A | | 6/1994 | Brantley |
| 5,746,391 | A | * | 5/1998 | Rodgers et al. ............... 244/54 |
| 2005/0081531 | A1 | * | 4/2005 | Stretton et al. ............... 60/797 |

FOREIGN PATENT DOCUMENTS

EP 0 522 688 A2 1/1993
FR 0 698 848 6/1994

* cited by examiner

*Primary Examiner*—Teri Pham Luu
*Assistant Examiner*—Joshua Michener
(74) *Attorney, Agent, or Firm*—Oblon, Spivak, McClelland, Maier & Neustadt, P.C.

(57) ABSTRACT

This invention relates to a mounting system (1) inserted between an aircraft engine and a rigid structure of an attachment strut, the system particularly comprising a thrust resistance device (20). The thrust resistance device (20) comprises two lateral actuators (30) each provided with a rod (34) in which a forward end (34b) is a piston located inside a chamber (38) of a central casing (22) of the engine, the chamber (38) comprising a forward compartment (40) and an aft compartment (42). Moreover, the thrust resistance device (20) comprises a device (32) including a piston (48) fixed to the forward mount (16) and located inside a chamber (50) fixed to the central casing, the chamber (50) comprising a forward compartment (52) and an aft compartment (54), the forward compartment (52) of the chamber (50) being hydraulically connected to the aft compartments (42) of the actuators (30).

10 Claims, 4 Drawing Sheets

MOUNTING SYSTEM INSERTED BETWEEN AN AIRCRAFT ENGINE AND A RIGID STRUCTURE OF AN ATTACHMENT STRUT FIXED UNDER A WING OF THIS AIRCRAFT

TECHNICAL FIELD

This invention relates in general to a mounting system inserted between an aircraft engine and a rigid structure of an attachment strut fixed under a wing of this aircraft.

The invention also relates to an attachment strut for an aircraft engine fitted with such a mounting system, and this mounting system and the attachment strut can also be used on any type of aircraft.

STATE OF PRIOR ART

An aircraft attachment strut is designed to form the connecting interface between an engine and a wing of the aircraft. It transmits forces generated by the associated engine to the structure of this aircraft, and it also enables routing of the fuel, electricity, hydraulics and air between the engine and the aircraft.

In order to transmit forces, the strut comprises a rigid structure, for example of the <<caisson>> type, in other words formed by the assembly of upper and lower stringers connected to each other through transverse ribs.

Furthermore, the strut is equipped with a mounting system inserted between the engine and the rigid structure of the strut, this system globally including at least two mounts, generally a forward mount and an aft mount.

Furthermore, the mounting system comprises a system for resisting thrusts generated by the engine. In prior art, this device is typically in the form of two lateral rods connected firstly to a forward part of the central casing of the engine and secondly to the aft mount.

Similarly, the attachment strut also comprises a second mounting system inserted between the strut and the wing of the aircraft, this second system normally being composed of two or three mounts.

Finally, the strut is provided with a secondary structure segregating and maintaining the systems while supporting aerodynamic fairings.

In a manner known to those skilled in the art, thrusts generated by the engine normally cause more or less severe longitudinal bending of the engine, namely bending resulting from a torque generated from the thrusts and applied along a transverse axis of the aircraft. In this respect, note also that thrusts are the sole cause of longitudinal bending of the engine during aircraft cruising phases.

Two cases can arise when this type of longitudinal bending occurs, particularly during the aircraft cruising phases. In a first case in which no particular precautions have been taken related to the observed bending, high friction inevitably occurs firstly between the rotating blades of the fan and the fan casing, and secondly between the rotating compressor and turbine blades and the engine central casing. The main consequence of this friction is then premature engine wear, which naturally reduces the life of the engine and its performances. In a second case in which operating clearances are adapted such that there is practically no contact caused by longitudinal bending, the engine efficiency is then very much reduced.

Considering the above, it is obviously necessary to design a device for resisting thrusts that minimizes longitudinal bending of the engine due to these thrusts, so as to minimize constraining friction without needing to oversize the operating clearances mentioned above.

It has been observed that none of the thrust resistance devices according to prior art is capable of entirely and satisfactorily limiting longitudinal bending of the engine resulting from the torque about the transverse axis related to thrusts, particularly during aircraft cruising phases.

OBJECT OF THE INVENTION

Therefore, the purpose of the invention is to propose a mounting system inserted between an aircraft engine and a rigid structure of an attachment strut fixed under a wing of this aircraft, this system at least partially overcoming the disadvantages mentioned above related to embodiments according to prior art.

Another purpose of this invention is to present an attachment strut for an aircraft engine provided with such a mounting system.

To achieve this, the object of the invention is a mounting system inserted between an aircraft engine and a rigid structure of an attachment strut fixed under a wing of this aircraft, the system including a forward mount, an aft mount, and a device for resisting thrusts generated by the engine. According to the invention, the device comprises two lateral actuators arranged one on each side of the engine, each actuator being provided with a rod, in which the aft end is connected to one of the mounts, preferably the forward mount, and the forward end of the rod is a piston located inside a chamber fixed to a forward part of a central casing of the engine, the chamber comprising a forward compartment and an aft compartment separated by the piston. Secondly, the thrust resistance device also comprises a hydraulic piston device comprising a piston fixed to the forward mount and located inside a chamber fixed to the forward part of the central casing of the engine, the chamber comprising a forward compartment and an aft compartment separated by the piston, and the forward compartment of the chamber of the hydraulic piston device being hydraulically connected to the aft compartments of the lateral actuators.

Advantageously, the mounting system according to the invention includes a thrust resistance device that considerably improves the resistance of these forces compared with the resistance observed in prior art using the conventional lateral connecting rods solution, since this device can entirely eliminate the torque about the transverse axis applied to the engine related to these thrusts and applied to the engine, with appropriate sizing of the two lateral actuators and the hydraulic piston device. As will be described in detail below, the two lateral actuators and the hydraulic piston device act more or less like a vertical spreader beam system in which forces transmitted to the engine cancel out the entire torque about the transverse axis during cruising phases, regardless of the thrust forces encountered.

Consequently, the presence of such a thrust resistance device during aircraft cruising phases prevents any longitudinal bending from being applied to the engine. As a result, there is no premature wear of the engine constituents, and therefore the life and performances of the engine are no longer reduced.

It is also indicated that the mounting system is advantageously a statically determinate system which very much facilitates its design.

Preferably, the aft compartment of the chamber of the hydraulic piston device is hydraulically connected to the forward compartments of the lateral actuators.

Advantageously, the connection mentioned above also provides a means of canceling out the torque about the transverse axis and longitudinal bending of the engine when it operates in reverse thrust mode.

Preferably, the forward compartments of the two lateral actuators are hydraulically connected, and the aft compartments of these same two actuators are also hydraulically connected. Consequently, the connections made assure that forces passing through each of the two rods of the lateral actuators applied during the cruising phases are approximately equal, without it being necessary to add a spreader beam connecting the two rods to the forward mount or the aft mount, as was necessary in prior art. Thus, the horizontal spreader beam effect obtained using the lateral actuators advantageously enables the thrust resistance device to be globally more compact than would have been possible in prior art.

Preferably, the chambers of the lateral actuators and the hydraulic piston device are formed inside the forward part of the central casing of the engine, which even further reduces the size of the mounting system.

Preferably, the aft end of each of the two rods is connected to the forward mount. Nevertheless, it could obviously be connected to the aft mount without departing from the scope of the invention.

The system preferably comprises a forward mount fixed to the forward part of the central casing of the engine, and also comprises an aft mount fixed to an aft part of this central casing, and to the rigid structure of the strut.

It would also then be possible for the forward mount to comprise a ball joint mounted on a hinge pin oriented along a longitudinal direction of the aircraft, and for the piston in the hydraulic piston device to be fixed to this hinge pin and arranged to be approximately perpendicular to this longitudinal direction.

According to a first preferred embodiment of this invention, the forward compartment of the chamber of the hydraulic piston device is hydraulically connected only to the aft compartments of the lateral actuators.

According to a second preferred embodiment of this invention, the forward compartment of the hydraulic piston device is also hydraulically connected to a high pressure hydraulic supply and is provided with at least one leak orifice, for which access can be enabled/disabled by a device fixed to the piston as a function of the hydraulic pressure inside the forward compartment, and as a function of thrust forces generated by the engine.

Similarly, the aft compartment of the hydraulic piston device can also be hydraulically connected to a high pressure hydraulic supply and provided with at least one leak orifice, for which access can be enabled/disabled by a device fixed to the piston as a function of the hydraulic pressure existing inside the aft compartment, and as a function of the reverse thrusts generated by the engine. Thus, with this arrangement, operation of the thrust resistance device is also possible when the engine is in reverse thrust mode.

Another object of the invention is an attachment strut for an aircraft engine under a wing of this aircraft, said strut being provided with a mounting system inserted between the engine and a rigid structure of this strut. According to the invention, the mounting system is like that described above and is also one purpose of this invention.

Other advantages and special features of the invention will become clearer in the non-limitative detailed description given below.

BRIEF DESCRIPTION OF THE DRAWINGS

This description will be made with reference to the appended figures, wherein.

DETAILED DESCRIPTION OF PREFERRED EMBODIMENTS

Figure 1:
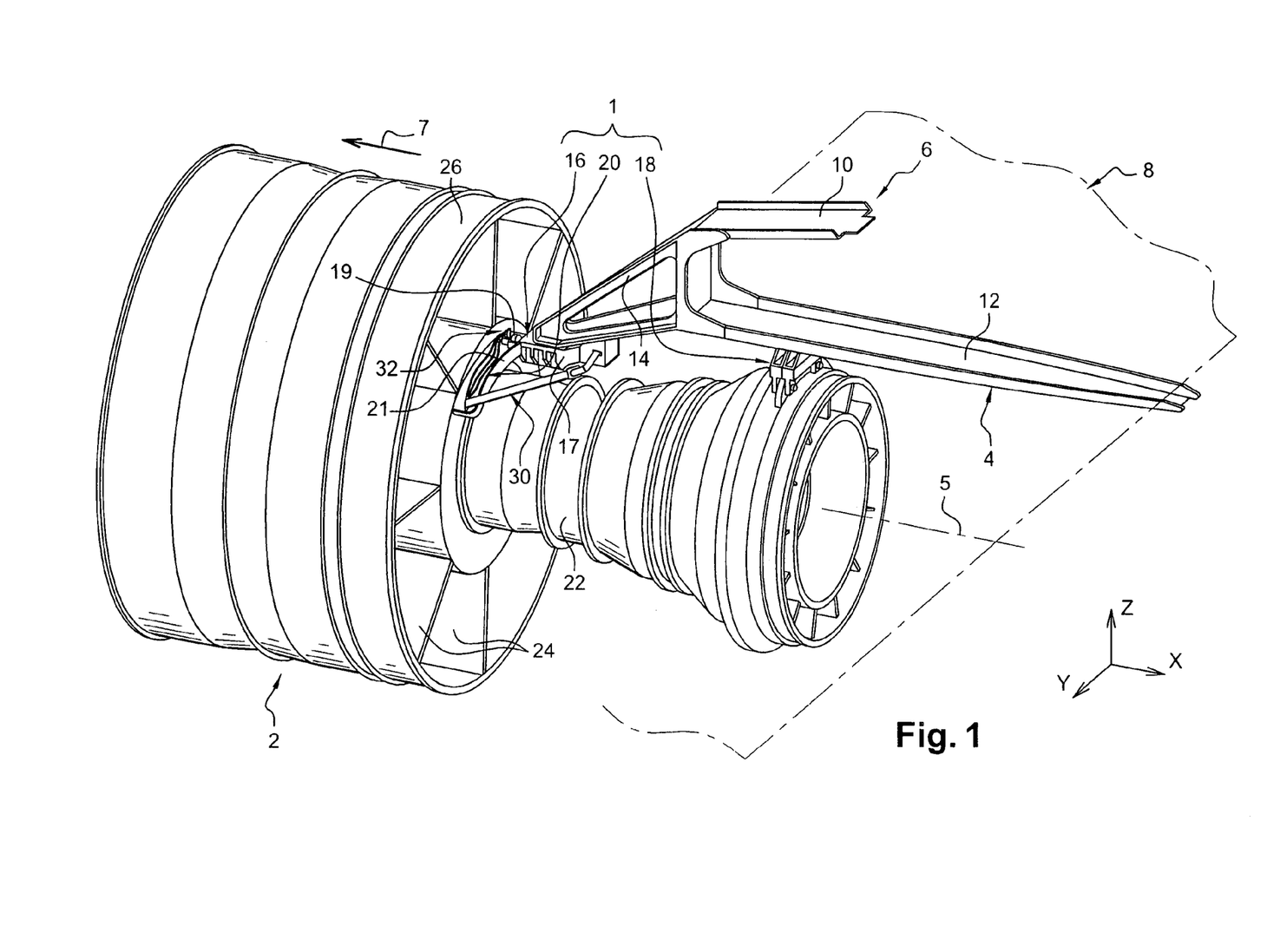
FIG. 1 shows a perspective view of a mounting system inserted between an aircraft engine and a rigid structure of an attachment strut fixed under a wing of this aircraft, according to a first preferred embodiment of this invention.

FIG. 1 shows a mounting system 1 according to a first preferred embodiment of this invention, this mounting system 1 being inserted between an aircraft engine 2 and a rigid structure 4 of an attachment strut 6 fixed under an aircraft wing shown diagrammatically for obvious reasons of clarity, and denoted generally by the numeric reference 8. Note that the mounting system 1 shown on this single figure is adapted to cooperate with a turbojet 2, but obviously it could be a system designed to suspend any other type of engine such as a turboprop, without departing from the scope of the invention.

Throughout the description given below, by convention, X is the direction parallel to a longitudinal axis 5 of the engine 2, Y is the direction oriented in the transverse direction of the aircraft, and Z is the vertical direction, these three directions being orthogonal to each other.

Secondly, the terms <<forward>> and <<raft>> should be considered with respect to a direction of movement of the aircraft that takes place as a result of the thrust applied by the engines 2, this direction being shown diagrammatically by the arrow 7.

Only one portion of the rigid structure 4 of the attachment strut 6 is shown on FIG. 1, obviously accompanied by the mounting system 1 forming an integral part of this strut 6, this strut also being one purpose of this invention.

The other component elements of this strut 6 that are not shown, such as the attachment means of the rigid structure 4 under aircraft wing 8, or the secondary structure segregating and maintaining systems while supporting aerodynamic fairings, are conventional elements identical to or similar to those encountered in prior art, and known to those skilled in the art. Consequently, they will not be described in detail herein.

In a known manner, it is indicated that the rigid structure 4 is globally made by the assembly of lower stringers 12 and upper stringers 10 connected to each other through several transverse ribs (not shown). Furthermore, a forward part of this rigid structure 4 is composed of a pyramid 14, also known to those skilled in the art and therefore in the form of a structure starting from a base and extending towards a vertex in the forward direction, getting closer to the longitudinal axis 5 of the engine 2.

On FIG. 1, it can be seen that the mounting system 1 comprises firstly a forward mount 16, an aft mount 18 and a device 20 resisting thrusts generated by the engine 2. In this respect, note that the two mounts 16 and 18 mentioned above are of the conventional type and are known to those skilled in the art. Consequently, they will only be described briefly, for information and in no way limitatively.

The forward mount 16 is fixed firstly to a forward end of the pyramid 14 of the rigid structure 4, in other words its vertex, and secondly fixed to a forward part of a central casing 22 of the engine 2. More precisely, the forward mount 16 penetrates into a portion of the central casing 22 on which fixed blades 24 are fitted connecting a fan casing 26 of the engine 2 to this same central casing 22.

This forward mount 16 comprises generally a ball joint (not shown), also called a <<monoball>>, that penetrates inside the central casing 22 to resist forces along the vertical Z direction and along the transverse Y direction. Moreover, the forward mount 16 comprises a body 17.

Furthermore, FIG. 1 shows that the upper radial portion 21 located at the forward part of the central casing 22 and shown cut-out for reasons of clarity, extends radially outwards from a part of the casing 22 further towards the aft direction, and for example extends around an angular sector of about 90°.

Furthermore, the aft mount 18 is fixed firstly to an aft part of the central casing 22, and is fixed secondly to a lower stringer 12 of the rigid structure of the strut 6. The conventional aft mount 18 shown on the single figure is composed globally of clevises and fittings, and resists forces along the Y and Z directions, and resists the moment applied about the X direction.

The special feature of this invention is in the fact that the mounting system 1 comprises a thrust resistance device 20 designed to completely cancel the longitudinal bending of the engine 2 resulting from a torque about the transverse axis related to these thrusts. Thus, there is no longitudinal deformation of this engine 2 during aircraft cruising phases in which the longitudinal bending of the engine 2 is normally exclusively due to thrusts.

Firstly, note that a vertical XY plane passing through the longitudinal axis 5 of the engine 2 forms a plane of symmetry for the thrust resistance device 20.

As can be seen on FIG. 1, this device 20 comprises mainly two lateral actuators 30 (only one being shown) arranged on each side of the central casing 22, and a hydraulic piston device 32 globally along the forward prolongation of the forward mount 16, adjacent to the ball joint 19.

Figure 2:
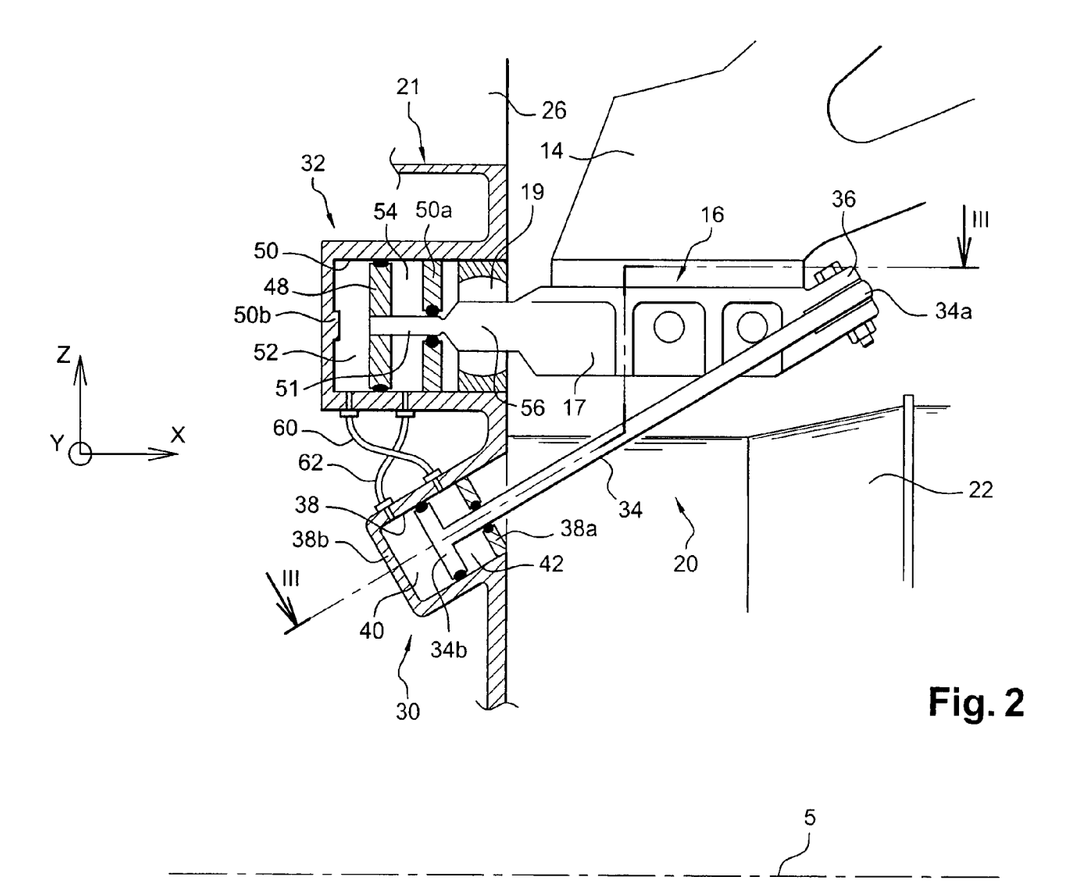
FIG. 2 shows a partial side view of FIG. 1.
Figure 3:
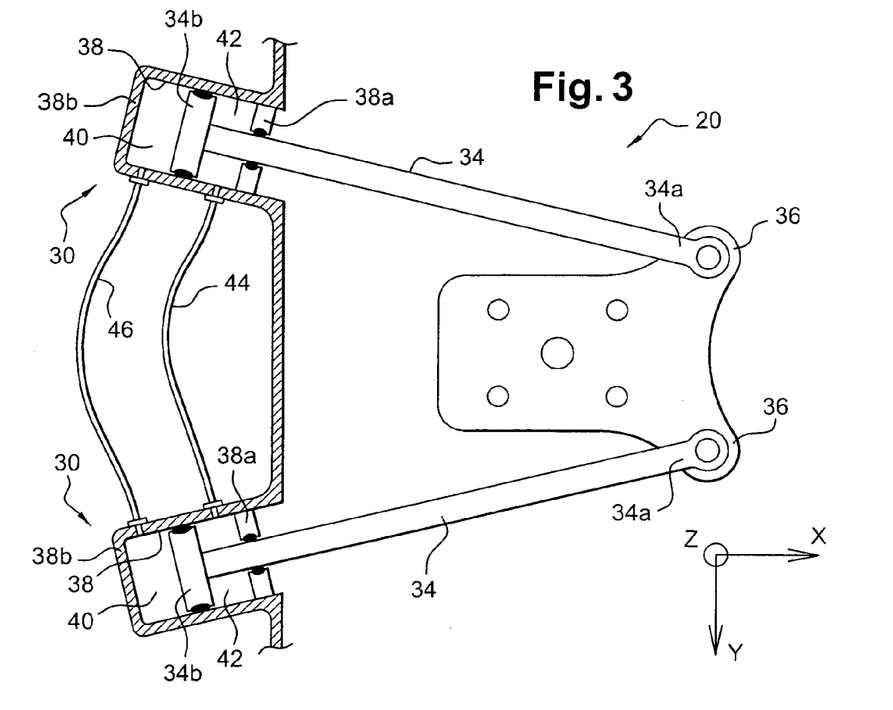
FIG. 3 shows a sectional view taken along line III—III in FIG. 2.

With reference more specifically to FIGS. 2 and 3, it can be seen that each of the lateral actuators 30 which are preferably identical and therefore arranged symmetrically about the XZ plane passing through the axis 5, has a rod 34 such that the distance between this rod and the XZ plane reduces towards the top and towards the aft direction. An aft end 34a of the rod 34 is mounted on a double headed lug 36 located at an aft end of the body 17 of the forward mount 16. Thus, the aft end 34a may be mounted hinged between the two heads of the lug 36, for example by means of a ball joint or a hinge pin (not referenced).

The rod 34 also includes a forward end 34b in the form of a piston located inside a chamber 38 in which this piston 34b can be moved, the chamber 38 preferably being made directly inside the upper portion 21 of the forward part of the central casing 22. This chamber 38 then comprises a forward compartment 40 and an aft compartment 42 separated by the piston 34, in which a fluid such as oil is located. In the same way as the piston 34b, the chamber 38 is then preferably cylindrical with a circular section, and comprises a cylindrical aft wall 38a through which the rod 34 passes perpendicularly in a sealed manner, and a forward cylindrical wall 38b parallel to wall 38a and to piston 34b.

With reference more particularly to FIG. 3, it can be seen that the aft compartments 32 are hydraulically connected, for example using flexible pipes 44. Consequently, when the engine 2 applies thrusts, the hydraulic connection made ensures that the oil pressure will increase identically in the two aft compartments 42, such that the forces resisted by the two rods 34 and transmitted to the forward mount 16 are also approximately the same.

Similarly, the forward compartments 40 are also hydraulically connected, always using flexible pipes 46. Thus, the horizontal spreader beam effect achieved by the lateral actuators 30 may also be achieved when the engine 2 is operating in reverse thrust mode.

Once again with reference to FIG. 2, it can be seen that the hydraulic piston device 32 comprises a piston 48 located inside a chamber 50, in which this piston 48 can move, the chamber 50 preferably being made directly inside the upper portion 21 of the forward part of the central casing 22. This chamber 50 then comprises a forward compartment 52 and an aft compartment 54 separated by the piston 48, and in which there is a fluid identical to the fluid in the chambers 38. In the same way as the piston 48, the chamber 50 is then preferably cylindrical with a circular section and comprises an aft cylindrical wall 50a through which a piston rod 51 passes perpendicular and in a sealed manner, together with a forward cylindrical wall 50b parallel to the wall 50a and the piston 48.

Furthermore, with reference to the vertical Z direction and considering a side view of the thrust resistance device 20, it can be seen that the piston 48 of the device 32 is located above the pistons 34b of the actuators 30. Thus, still with reference to the same view, the forces applied by the fluid pressure in chamber 50 are higher than the forces applied by the fluid pressure in the chambers 38.

It can be seen that in this first preferred embodiment of the invention, the ball joint 19 of the forward mount 16 is mounted on a hinge pin 56 oriented along the X direction, this hinge pin 56 itself being fixed to the body 17 of the mount 16. In this respect, the piston 48 is mounted fixed onto the hinge pin 56 through the piston rod 51 arranged along the prolongation of the piston, and is located forward from this hinge pin 56, approximately perpendicular to the X direction.

In other words, the piston 48 is preferably capable of moving along the X direction inside the chamber 50, unlike the pistons 34b of the actuators 30 that can be moved along the directions of the associated rods 34, namely along directions such that the distance of the axis 5 from the XZ plane reduces towards the aft direction and upwards.

As will be described in more detail below, in order to cancel out the torque about the transverse axis applied to the engine 2 related to the thrusts, the forward compartment 52 of the chamber 50 is hydraulically connected to the two aft compartments 42 of the chamber 38, preferably using flexible pipes 60. In this way, the fluid pressure inside the forward compartment 52 is approximately identical to the fluid pressure inside the aft compartments 42 at all times.

Note also that in order to obtain the same effect canceling out the torque about the transverse axis when the engine 2 is operating in reverse thrust mode, flexible pipes 63 are provided to hydraulically connect the aft compartment 54 of the chamber 50 and the two forward compartments 40 of the chambers 38.

Figure 4:
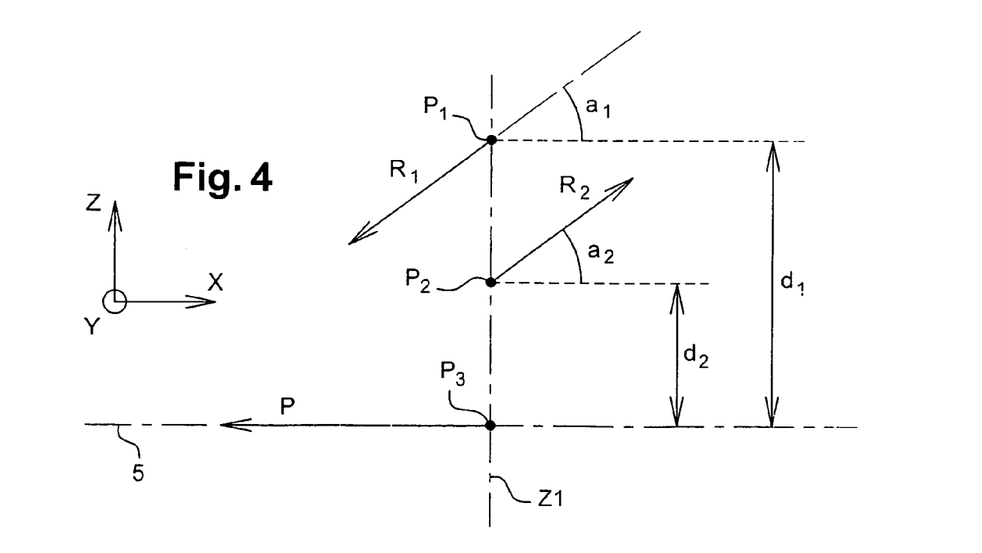
FIG. 4 shows a force diagram showing all forces applied on the engine on which the thrust resistance device in FIG. 1 is installed when the aircraft is in a cruising phase.

FIG. 4 shows a force diagram demonstrating that the torque about the transverse axis applied to the engine 2 during cruising phases can be cancelled out, by judiciously dimensioning the actuators 30 and the hydraulic piston device 32.

Firstly, this diagram shows the projection of the various forces onto the vertical XY plane passing through the axis 5, and it can be seen that thrusts symbolized by the arrow P are present, and these forces act forwards along the X direction.

Furthermore, the arrow R1 symbolizes pressure forces applied by the fluid contained in the chamber 50 of the device 32, and the arrow R2 symbolizes the sum of pressure forces applied by the fluid contained in the two chambers 38 of the lateral actuators 30.

These forces R1 and R2 are oriented in the aft and forward directions respectively, at angles a1 and a2 from the X direction. Note that the opposite direction of the forces R1 and R2 is obtained simply by making the hydraulic connection described above, namely the connection between firstly the forward compartment 52 of the chamber 50, and secondly the aft compartments 42 of the two chambers 38.

For guidance, note that the angle a1 is zero in the case of the first preferred embodiment shown on FIGS. 1 to 3. Furthermore, the application points P1 and P2 of the forces R1 and R2 are at distances d1 and d2 respectively from the axis 5 along a vertical line Z1 also passing through a point P3 corresponding to the application point of the thrusts. Naturally, it should be understood that the vertical position of points P1 and P2 with respect to point P3 and the value of angles a1 and a2 depend on the global geometry of the thrust resistance device 20.

Consequently, all that is necessary for the torque about the transverse axis applied to the engine 2 to be cancelled out, is for the values of the three forces involved P, R1 and R2 to satisfy the following system of equations, in which equation (a) corresponds to the sum of moments applied to point P3, and for which equation (b) corresponds to the sum of moments applied to point P1:

$$R1.\cos(a1).d1 - R2.\cos(a2).d2 = 0 \quad (a)$$

$$R2.\cos(a2).(d1-d2) = P.d1 \quad (b)$$

Therefore, this equation system clearly shows that the ratio between R1 and R2 is constant, independent of P, and is related only to the global geometry of the thrust resistance device 20.

The ratio mentioned above satisfies the following equation (c):

$$R2/R1 = (\cos(a1).d1)/(\cos(a2).d2) \quad (c)$$

Consequently and as indicated above, it is sufficient to size the actuators 30 and the device 32 such that a ratio k corresponding to R1/R2 satisfies equation (c), to cancel out the torque about the transverse axis applied to the engine 2, regardless of the value of the thrusts during cruising phases.

In this respect, if $\Phi 1$ is the diameter of the piston 48 and $\Phi 2$ is the diameter of each of the two pistons 34b, then the values of these diameters will be chosen such that they satisfy the following equation (d):

$$\Phi 2 = \Phi 1.\sqrt{(k/2)} \quad (d)$$

Obviously, it can be seen that when the diameters $\Phi 2$ and $\Phi 1$ satisfy equation (d), they also result in the torque about the transverse axis being cancelled out when the engine operates in reverse thrust mode, particularly due to flexible pipes 63 hydraulically connecting firstly the aft compartment 54 of the chamber 50, and secondly the forward compartments 40 of the two chambers 38.

In this first preferred embodiment, the forward compartment 52 of the chamber 50 is hydraulically connected only to the aft compartments 42 of the actuators 30, and each of the two aft compartments 42 of the chamber 38 is hydraulically connected only to the forward compartment 52 of the chamber 50. In other words, the forward compartment 52, the aft compartments 42 and the flexible pipes 60 together form a closed assembly inside which fluid can circulate freely. Furthermore, no external fluid can enter this assembly except during filling and draining operations of elements 52, 42 and 60, and the fluid contained in it cannot escape from it.

Note also that properties related to the assembly 52,42,60 that has just been described are preferably also valid for the assembly composed of the aft compartment 54, the forward compartments 40 and the flexible pipes 63.

Thus, when the aircraft is in a cruising phase and the engine 2 applies thrust forces P, the fluid pressure inside the two aft compartments 42 will increase until it reaches the value <<Vp>> necessary to resist these forces P, this value being the same in the two compartments 42 due to the hydraulic connection made. The pressure increase is due to compression of the fluid, which generates forces R2 on the aft wall 52a of the chambers 52.

At the same time, the fluid inside the forward compartment 52 is at the same pressure <<Vp>> as the fluid inside the aft compartments 42, also due to the hydraulic connections made. In this way, the fluid present in the forward compartment 52 generates forces R1 on the forward wall 50b of the chamber 50. And as mentioned above, the geometry and the size of the thrust resistance device 20 are such that these forces R1 resulting from the pressure <<Vp>> are such that they resist the thrust forces P, and at the same time they also cancel out the torque about the transverse axis due to forces R2.

Finally, note that in this first preferred embodiment of the present invention, the measurement of the difference in fluid pressure between the forward and aft compartments of one of the chambers 38,50 can be used to determine the pressure forces applied by the engine 2, due to the proportionality relation between these data.

Figure 5:
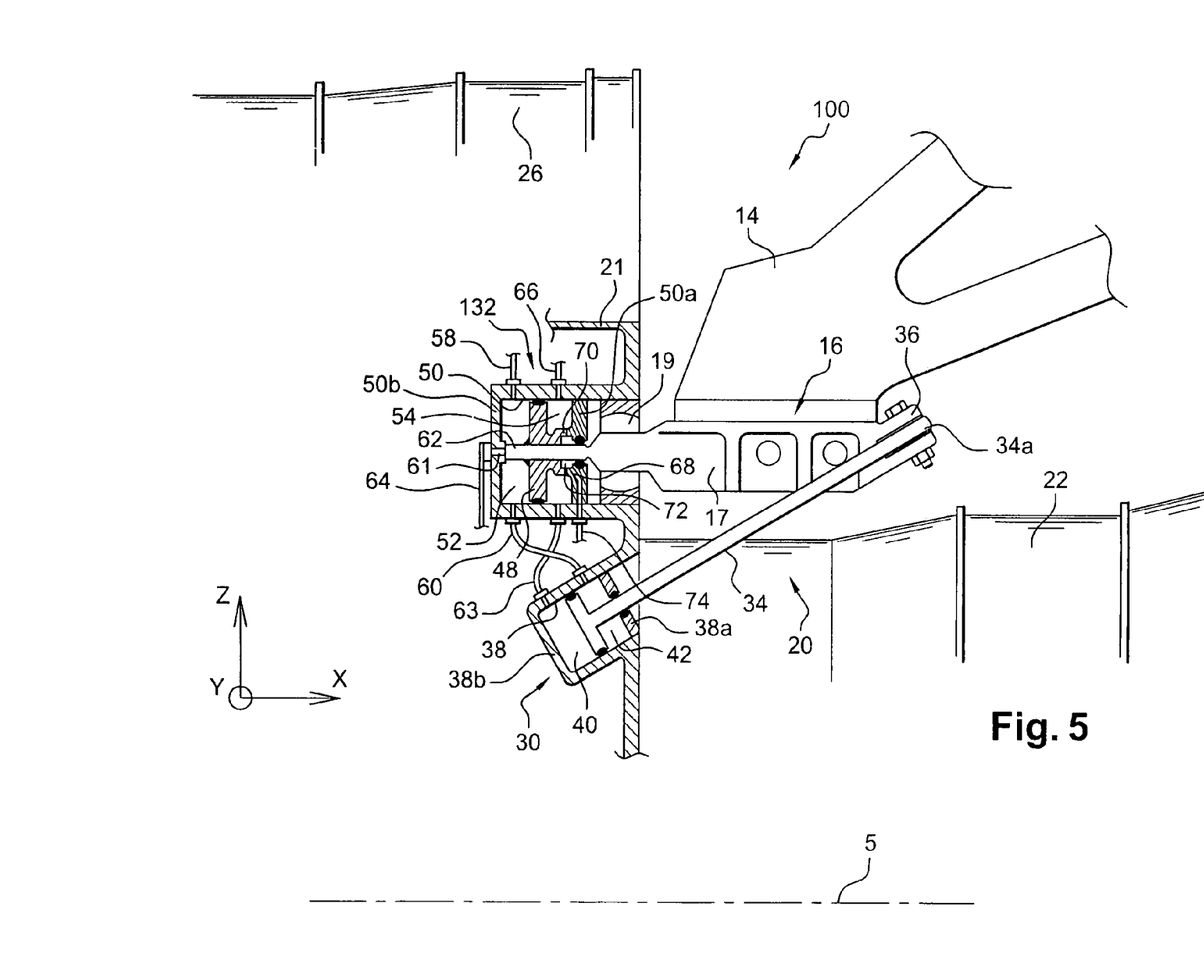
FIG. 5 shows a view similar to FIG. 2, when the mounting system inserted between an aircraft engine and a rigid structure of an attachment strut fixed under a wing of this aircraft is made according to a second preferred embodiment of this invention.

FIG. 5 shows a mounting system 100 according to a second preferred embodiment of this invention, this mounting system 100 being similar to the mounting system 1 in the first preferred embodiment described above.

In this respect, note that in FIGS. 1 to 5, elements with the same numeric references correspond to identical or similar elements.

Thus, it can be seen that in this second preferred embodiment of the present invention, only the hydraulic piston device 132 is different from the device 32 in the first preferred embodiment.

The device 132 includes all elements of the device 32 and also includes other additional elements which will now be described.

The forward compartment 52 is hydraulically connected to the aft compartments 42, but also to a high pressure hydraulic supply 58. This supply 58 continuously supplies the forward compartment 52 with fluid at a pressure greater than the pressure used to resist maximum thrust forces that the engine 2 can generate.

Furthermore, the forward compartment 52 is provided with a leak orifice 61, for example located on the forward wall 50b of the chamber 50, and for which access can be enabled/disabled by a device 62 fixed to the piston 48. This device 62 facing the leak orifice 61 can expose or close off this orifice 61, firstly by breaking the contact with the forward wall 50b and coming into contact with this same wall, and as a function of the position of the piston 48 in the chamber 50. In other words, access to the leak orifice 61 is enabled/disabled by the device 60 as a function of the hydraulic pressure inside the forward compartment 52, and as a function of thrust forces generated by the engine 2. Preferably, and as can be seen on FIG. 5, the device 62 may be in the form of a hinge pin centered with respect to piston 48 and located forward from the piston.

Thus, during operation, the high fluid pressure output by the supply 58 implies that the piston 48 will move in the aft direction carrying the device 62 with it, which then exposes the leak orifice 61. Therefore some of the fluid will exit from the compartment 52 through this orifice 61, and then will move towards a leakage circuit 64 that is preferably hydraulically connected to the high pressure supply 58. Consequently, releasing the leak orifice 61 simultaneously reduces the fluid pressure inside the compartment 52 which becomes very low, which makes the piston 48 return forwards. This displacement of the piston 48 in the forward direction is then stopped by the device 62 coming into contact with the forward wall 50b that once again closes off the leak orifice 61. Then, due to the presence of the high pressure supply 58 and the orifice 61 being closed off, the pressure inside the compartment 52 increases and the piston 48 then moves in the aft direction again when this pressure exceeds the pressure necessary to resist the instantaneous thrusts generated by the engine 2.

In this way, the permanent to-and-fro movement described by the piston 48 is such that the fluid pressure inside the compartment 52 at any time is equal to the exact pressure necessary to resist the thrusts applied at the same time. Therefore, measuring this pressure would make it possible to determine instantaneous thrusts, always making use of the proportionality relation that exists between these data.

Note that the function that has just been described can also work in reverse thrust mode.

To achieve this, in the same way as described above, the aft compartment 54 is then hydraulically connected to a high pressure hydraulic supply 66. This supply 66 continuously supplies fluid to the aft compartment 54, at a pressure greater than the pressure necessary to oppose the maximum reverse thrusts that the engine 2 can generate.

Furthermore, the compartment 54 is provided with a leak orifice 68, for example located on the aft wall 50a of the chamber 50, and for which access can be enabled/disabled by a device 70 fixed to the piston 48. As can be shown on FIG. 5, this device 70 may be in the form of a crown with an axis parallel to the X direction, which defines a closed chamber 72 when it is in contact with the wall 50a, inaccessible to the fluid contained in the aft compartment 54, this chamber 72 also communicating with the leak orifice 68. On the other hand, when the piston 48 moves forwards, the contact between the device 70 and the aft wall 50a is broken such that fluid can then penetrate in the chamber 72 and escape through the leak orifice 68 towards a leakage circuit 74, which is preferably also hydraulically connected to the high pressure supply 66, independent of the high pressure supply 58. Preferably, and as can be seen on FIG. 5, the device 70 is obviously behind the piston 48.

Note that the high pressure supplies 58 and 66 can each operate using a pump with a gear assembled on an accessories box of the engine 2, this type of pump being preferred in that it can provide very high pressures at low flow.

It is also noted that the devices 62 and 70 may advantageously fulfill the mechanical stops function in the case of a hydraulic leak, in cooperation with walls 50b and 50a of the chamber 50.

Furthermore, even if it is not shown on FIG. 5, the devices 62 and 70 are obviously not simultaneously in contact with walls 50b and 50a respectively. An appropriate clearance is provided such that when one of the devices 62, 70 is in contact with its associated wall 50b, 50a, the other device is located at a distance from its associated wall. Consequently, when access to one of the orifices 61 and 68 is disabled, access to the other orifice is enabled. In this respect, note that the defined clearance is small enough such that during assembly, the devices 62 and 70 enable good positioning of the engine 2 with respect to the strut 6 along the longitudinal X direction.

Furthermore, this clearance is such that during the to and fro movement described by piston 48 during operation of the engine 2 in normal thrust mode, access to the orifice 68 is always enabled, such that the fluid pressure existing inside the compartment 54 is always very small or even zero. Obviously, this statement is also valid for access to the orifice 61 when the engine 2 is operating in reverse thrust mode.

Finally, note that the high pressure supplies 58 and 66 and the leak orifices 61 and 68 could also have been located in one of the two chambers 38 of the lateral actuators 30, without departing from the scope of the invention.

Obviously, those skilled in the art could made various modifications to the mounting systems 1 and 100 and to the attachment strut 6 that have just been described as non-limitative examples only.

The invention claimed is:

1. Mounting system inserted between an aircraft engine and a rigid structure of an attachment strut fixed under a wing of this aircraft, the system including a forward mount, an aft mount, and a device for resisting thrusts generated by the engine, wherein: said device comprises two lateral actuators arranged one on each side of the engine, each actuator being provided with a rod in which an aft end is connected to one of said forward and aft mounts and for which one forward end is a piston located inside a chamber fixed to a forward part of a central casing of the engine, said chamber comprising a forward compartment and an aft compartment separated by said piston;

and wherein said thrust resistance device also comprises a hydraulic piston device comprising a piston fixed to the forward mount and located inside a chamber fixed to said forward part of the central casing of the engine, said chamber comprising a forward compartment and an aft compartment separated by said piston, said forward compartment of said chamber of the hydraulic piston device being hydraulically connected to said aft compartments of the lateral actuators.

2. Mounting system according to claim 1, wherein said aft compartment of said chamber of the hydraulic piston device is hydraulically connected to said forward compartments of the lateral actuators.

3. Mounting system according to claim 1 or 2, wherein said forward compartments of the two lateral actuators are hydraulically connected, and said aft compartments of these two lateral actuators are also hydraulically connected.

4. Mounting system according to claim 1, wherein said chambers are formed inside the forward part of the central casing of the engine.

5. Mounting system according to claim 1, wherein the aft end of each of the two rods is connected to said forward mount.

6. Mounting system according to claim 1, wherein said system comprises a forward mount fixed to the forward part of the central casing of the engine, and said system also comprises an aft mount fixed to one aft part of the central casing of the engine and to the rigid structure of the strut.

7. Mounting system according to claim 6, wherein the forward mount comprises a ball joint mounted on a hinge pin oriented along a longitudinal direction (X) of the aircraft, and the piston of the hydraulic piston device is fixed to this hinge pin, and arranged to be approximately perpendicular to this longitudinal direction (X).

8. Mounting system according to claim 1, wherein the forward compartment of the chamber of the hydraulic piston device is hydraulically connected only to the aft compartments of the lateral actuators.

9. Mounting system according to claim 1, wherein said forward compartment of the hydraulic piston device is also hydraulically connected to a high pressure hydraulic supply and is provided with at least one leak orifice for which access can be enabled/disabled by a device fixed to said piston, as a function of the hydraulic pressure inside the forward compartment, and as a function of thrust forces generated by the engine.

10. Mounting system according to claim 9, wherein said aft compartment of the hydraulic piston device is also hydraulically connected to a high pressure hydraulic supply and is provided with at least one leak orifice for which access can be enabled/disabled by a device fixed to said piston, as a function of the hydraulic pressure inside the aft compartment, and as a function of the reverse thrusts generated by the engine.

* * * * *